US005599615A

United States Patent [19]

Swift et al.

[11] Patent Number: 5,599,615

[45] Date of Patent: Feb. 4, 1997

[54] HIGH PERFORMANCE ELECTRIC CONTACTS

[75] Inventors: Joseph A. Swift, Ontario; Stanley J. Wallace, Victor, both of N.Y.

[73] Assignee: Xerox Corporation, Stamford, Conn.

[21] Appl. No.: 555,817

[22] Filed: Nov. 9, 1995

[51] Int. Cl.[6] .......... B32B 9/00

[52] U.S. Cl. .......... 428/293.1; 428/294; 428/295

[58] Field of Search .......... 428/292, 294, 428/295

[56] References Cited

U.S. PATENT DOCUMENTS

| | | | |
|---|---|---|---|
| 4,358,699 | 11/1982 | Wilsdorf | 310/251 |
| 5,139,862 | 8/1992 | Swift et al. | 428/294 |
| 5,270,106 | 12/1993 | Orlowski et al. | 428/295 |
| 5,281,771 | 1/1994 | Swift et al. | 174/262 |
| 5,354,607 | 10/1994 | Swift et al. | 428/294 |

OTHER PUBLICATIONS

V. Behrens et al., "Test Results of Different Silver/Graphite Contact Materials in Regard to Applications in Circuit Breakers," pp. 393–397, presented at IEEE Home Conference on Electrical contacts on Oct. 4, 1995.

S. J. Wallace and J. A. Swift, "Fuzzy Future for Electronic Contacts," EDN Products Edition, pp. 31–32 (Aug. 15, 1994).

*Primary Examiner*—Patrick Ryan
*Assistant Examiner*—Cathy K. Lam
*Attorney, Agent, or Firm*—Samuel E. Mott; Zosan S. Soong

[57] ABSTRACT

There is disclosed an electrical component for making electrical contact with another component comprising a composite member including a plurality of electrically conductive, nonmetallic fibers in an electrically conductive metallic matrix wherein said composite member has an axial direction and a DC volume resistivity of less than about 100 micro ohm cm, said plurality of conductive fibers being oriented in said matrix in a direction substantially parallel to each other and to the axial direction of said member and said fibers being continuous from one end of said member to the other end to provide a plurality of electrical contact points at each end of said member, at least one end of said member having a brush-like structure of said plurality of fibers wherein said brush-like structure is at least substantially free of the metallic matrix, thereby providing a distributed filament contact wherein the terminating ends of the fibers in the brush-like structure define an electrically contacting surface.

17 Claims, 4 Drawing Sheets

HIGH PERFORMANCE ELECTRIC CONTACTS

BACKGROUND OF THE INVENTION

The present invention relates to electrical components for making electrical contact with another component and electrical devices for conducting electrical current which include at least one of the electrical components. The electrical contact components and devices described herein, in addition to being well suited for low energy electronic/electrical signal level circuitry typified by contemporary digital and analog signal processing practices, are also particularly well suited to high power applications which require high contact power ratings and higher reliability which may rely on high bulk electrical and thermal conductivity and high surface densities of the fiber contact points in the contacts and may, for example, be used in power switching and power commutation applications. Typical of the type of machines which may use electrical contacts and devices are electrostatographic printing machines.

In electrostatographic printing apparatus commonly used today a photoconductive insulating member is typically charged to a uniform potential and thereafter exposed to a light image of an original document to be reproduced. The exposure discharges the photoconductive insulating surface in exposed or background areas and creates an electrostatic latent image on the member which corresponds to the image contained within the original document. Alternatively, a light beam may be modulated and used to selectively discharge portions of the charged photoconductive surface to record the desired information thereon. Typically, such a system employs a laser beam. Subsequently, the electrostatic latent image on the photoconductive insulating surface is made visible by developing the image with developer powder referred to in the art as toner. Most development systems employ developer which comprises both charged carrier particles and charged toner particles which triboelectrically adhere to the carrier particles. During development the toner particles are attracted from the carrier particles by the charged pattern of the image areas of the photoconductive insulating area to form a powder image on the photoconductive area. This toner image may be subsequently transferred to a support surface such as copy paper to which it may be permanently affixed by heating or by the application of pressure, to form the desired copy.

In commercial applications of such printing machines it is necessary to distribute power and/or logic signals to various sites within the machines. Traditionally, this has required conventional wires and wiring harnesses in each machine to distribute power and logic signals to the various functional elements in an automated machine. In such distribution systems, it is necessary to provide electrical connectors between the wires and components. In addition, it is necessary to provide sensors and switches, for example, to sense the location of copy sheets, documents, etc. Similarly, other electrical devices such as interlocks, and the like are provided to enable or disable a function. These electrical devices are usually low power operating at electronic signal potentials up to 5 volts and at currents in the milliamp regime. Further, many commercial applications employ electrical contact components and related devices that require use in higher power applications employing currents in the regime of 1–100 amps and voltages greater than 5 volts. The present invention is not limited to signal level currents or low potential applications, and includes applications in much higher power regimes requiring greater current carrying capacity which is enabled by the lower electrical contact resistance than previously achieved.

Most currently available devices performing both high level and low level contact functions have traditionally relied on metal to metal contact to complete the associated circuitry. While effective in many applications, these conventional devices nevertheless suffer from several difficulties in that metal contacts may be degraded over time by the formation of insulating films due to oxidation of the metal and those insulating films on the metal may not be capable of being pierced by the mechanical contact forces or by the low energy electrical power present in the circuit. Furthermore, these contacts are susceptible to contamination by dust and other debris in a machine environment such as toner particles, which are generally airborne within the machine and may collect and deposit on one or more of the contact surfaces, causing failure of the contact.

PRIOR ART

A class of electronic contacts with particular application to signal level applications has recently been developed based on the use of conductive fibers such as carbon fibers in a pultruded conductive or insulating polymer matrix. In particular, attention is directed to U.S. Pat. No. 5,139,862 to Swift et al., directed to a pultruded electronic device for conducting an electric current which has two contacting components at least one of which is a non-metallic electronic contact in the form of a pultruded composite member having a plurality of small conductive fibers in the polymer matrix which are oriented in the matrix substantially parallel to the axial direction of the composite member and are continuous from one end of the member to the other to provide the plurality of electrical contacts at each end of the member.

U.S. Pat. Nos. 5,270,106 to Orlowski et al. and 5,354,607 to Swift et al. are directed to a modification of the above identified pultruded electronic devices wherein at least one end of the electronic component is fibrillated to provide terminating ends of the fibers in a brush-like structure, the polymer having been removed at the pultrusion ends to provide the brush-like structure. Typically, the polymer may be removed by a laser beam to provide a laser fibrillated structure.

U.S. Pat. No. 5,281,771 to Swift et al. describes a further application of such fibrillated pultruded members providing densely distributed filament contacts in the form of a brush-like structure for use in multilayer wiring assemblies. While this patent refers to the fibers as being conductive, it is noted that in fact they are also described as being nonmetallic and have a DC volume resistivity of from about $1\times10^{-5}$ to about $1\times10^{10}$ ohm cm. As discussed in column 6, lines 55–60, of this patent, the term nonmetallic is used to distinguish from conventional metal fibers which exhibit metallic conductivity having resistivity of the order of $1\times10^{-6}$ ohm cm and to define a class of fibers which are nonmetallic but can be treated in ways to approach or provide metal like properties. As discussed in column 8, lines 12–13, of this patent, the host polymer can be doped to render it to become electrically conductive.

V. Behrens et al., "Test Results of Different Silver/Graphite Contact Materials in Regard to Applications in Circuit Breakers," pp. 393–397, presented at IEEE Home Conference on Electrical Contacts on Oct. 4, 1995, discloses silver/graphite contact materials which involve short, discontinuous carbon fibers as seen for example in FIG. 1 of this document (black rod shaped objects are the short, discontinuous carbon fibers). In addition, the carbon content consists partly of graphite powder and partly of graphite fiber.

U.S. Pat. No. 4,358,699 to Wilsdorf discloses an electrical fiber brush comprising metal fibers in a metallic matrix.

S. J. Wallace and J. A. Swift, "Fuzzy Future for Electronic Contacts," EDN Products Edition, pp. 31–32 (Aug. 15, 1994), discusses carbon fiber composites used in electrical connectors.

SUMMARY OF THE INVENTION

One aspect of the present invention is to provide electrical components and devices which are capable of higher power applications than the electronic signal level devices previously described, and in general, while being capable of operating in the signal level regime are also capable of operating above the signal level regime to employ currents in the single amp and greater regime and potentials substantially above the signal level regime. The electrical components according to the present invention provide a multiplicity (greater than 3) of independently acting contacts in the brush-like structure which are not achieved in a conventional solid metal structure. The fiber contacts are contained within a metallic matrix which permits the expansion of this contact's use into higher current carrying capacities because overall low electrical resistance is a particular improvement over the above described prior art. Accordingly, the possible utilization of the electrical components and devices according to the present invention is greatly expanded over that in the devices described above in the prior art.

In a further aspect of the present invention the metallic matrix is provided by a material having metallic conductivity such as metals including noble metals, metal alloys including eutectic metal alloys, and synthetic metals such as linear-chain polymeric conductors.

In a further aspect of the present invention the electrical component and device has a DC volume resistivity of less than about 10 micro ohm cm.

In a further aspect of the present invention the electrical component has applications across a broad range of power regimes from about less than 1 microwatt up to about 2500 watts, these generally corresponding to current levels of about 1 microamp to about 2 kiloamp.

In a further aspect of the present invention at least one end of the composite member is fibrillated by for example a water jet to form a short length brush-like structure, which is at least substantially free of the metallic matrix, and the metallic matrix is softer than the carbon fiber and preferentially erodes under energy of the water jet. The brush-like structure has a substantially uniform fiber length and there is a zone of demarcation between the brush-like structure and the portion of the composite member containing the metallic matrix.

In a further aspect of the present invention the conductive fibers are carbon fibers and in particular are carbonized polyacrylonitrile fibers having a diameter of from about 4 to about 50 microns and preferably from about 4 to 10 microns and a DC volume resistivity of from about $1\times10^{-5}$ ohm cm to $1\times10^{12}$ ohm cm and preferably from about $1\times10^{-5}$ ohm cm to about $10^{-2}$ ohm cm. In a further aspect of the present invention the fibers comprise at least four in number and can be higher.

These aspects and others are accomplished in embodiments by providing an electrical component for making electrical contact with another component comprising a composite member including a plurality of electrically conductive, nonmetallic fibers in an electrically conductive metallic matrix wherein said composite member has an axial direction and a DC volume resistivity of less than about 100 micro ohm cm, said plurality of conductive fibers being oriented in said matrix in a direction substantially parallel to each other and to the axial direction of said member and said fibers being continuous from one end of said member to the other end to provide a plurality of electrical contact points at each end of said member, at least one end of said member having a brush-like structure of said plurality of fibers wherein said brush-like structure is at least substantially free of the metallic matrix, thereby providing a distributed filament contact wherein the terminating ends of the fibers in the brush-like structure define an electrically contacting surface.

There is further provided in embodiments an electrical device for conducting electrical current comprising two contacting components at least one of said components being a composite member including a plurality of electrically conductive, nonmetallic fibers in an electrically conductive metallic matrix wherein said composite member has an axial direction and a DC volume resistivity of less than about 100 micro ohm cm, said plurality of conductive fibers being oriented in said matrix in a direction substantially parallel to each other and to the axial direction of said member and said fibers being continuous from one end of said member to the other end to provide a plurality of electrical contact points at each end of said member, at least one end of said member having a brush-like structure of said plurality of fibers wherein said brush-like structure is at least substantially free of the metallic matrix, thereby providing a distributed filament contact wherein the terminating ends of the fibers in the brush-like structure define an electrically contacting surface.

BRIEF DESCRIPTION OF THE DRAWINGS

The invention is illustrated with reference to the following representative figures in which the represented dimensions of parts are not necessarily to scale but rather may be exaggerated or distorted for clarity of illustration and ease of description.

DETAILED DESCRIPTION OF THE PRESENT INVENTION

Figure 1:
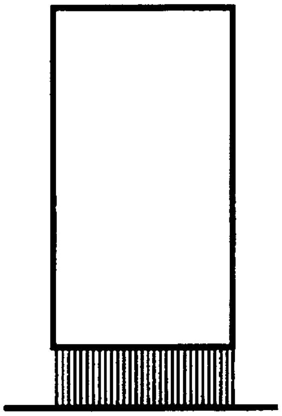
FIG. 1 is a side view illustrating a composite member which has had the metallic matrix removed from one end to expose the individual fibers which are each relatively long compared to the fiber diameter and will behave as a brush like mass when deformed.

As used herein, the term matrix refers to a binder material. In addition, the term fibrillation or fibrillated refers to the process of selective removal of the metallic matrix encasing the fibers in the composite member. A substantial portion of the metallic matrix, preferably all of the metallic matrix, is removed from an end portion of the composite member to form the brush-like structure.

In accordance with the present invention, an electrical component is provided and a variety of electrical devices for conducting electrical current such as switches, sensors, connectors, interlocks, commutators, etc. are provided which are of greatly improved reliability, are of low cost and easily manufacturable and are capable of reliably operating in low as well as high energy circuits.

According to the present invention an electrical component is made from a composite member having a fibrillated brush-like structure at one end which provides a preferably densely distributed filament contact with another component. By the phrase densely distributed filament contact it is intended to define an extremely high level of contact redundancy insuring electrical contact with another contact surface in that the contacting component has in excess of 1000 individual conductive fibers per square millimeter. In one embodiment, with the use of a laser, the composite member can be cut into individual segments and fibrillated in a one step process. The fibrillation methods described herein provide an electrical contact which is of low cost, long life, produces low electrical noise, doesn't shed and can be machined like a solid material and yet provides a long wearing, easily replaceable non-contaminating conductive contact.

Any suitable fiber may be used in the practice of the present invention. Typically, the conductive fibers are nonmetallic and have a DC volume resistivity of from about 10 micro ohm cm to about $10^{18}$ micro ohm cm and preferably from about 10 micro ohm cm to about 1000 micro ohm cm to minimize resistance losses and suppress radio frequency interference ("RFI"). The vast majority of applications will require fibers having resistivities within the above stated preferred range to enable effective current conduction. The term "nonmetallic" is used to distinguish from conventional metal fibers which exhibit metallic conductivity having a resistivity of the order of 10 micro ohm cm or less, and to define a class of fibers which are nonmetallic but can be treated in ways to approach or provide metal like properties such as by plating the fibers with a metal including those disclosed herein such as nickel, gold, and silver, wherein the metal plating may have a thickness ranging for example from about 0.1 micron to about 10 microns. Thus, in those embodiments where metal plated fibers are used, the term nonmetallic refers to the core material of the fibers. Higher resistivity materials may be used if the input impedance of the associated electrical circuit is sufficiently high. In addition, the individual conductive fibers are generally circular in cross section and are small, having a diameter generally in the order of from about 4 to about 50 micrometers and preferably from about 4 to 10 micrometers which can provide a very high degree of redundancy of fibers having good strength in a small cross sectional area. The fibers are typically flexible and compatible with the metallic matrix. Typical fibers include carbon fibers, pitch carbon fibers, carbon/graphite fibers, and metal plated carbon fibers. Carbonized polyacrylonitrile fibers are preferred. Preferably, the nonmetallic fiber material is present solely in the form of fibers, not partially as powder. The use of only fiber and the absence of powder (such as graphite powder) improves the mechanical strength of the composite member since powder occupies volume without providing strength.

One of the advantages of using conductive carbon fibers or similar nonmetallic fibers is that they have a negative coefficient of thermal conductivity so that as the individual fibers become hotter with the passage of, for example, a spurrious high current surge, they become more electrically conductive. This provides an advantage over metal contacts since metals operate in just the opposite manner and therefore metal contacts tend to burn out or self destruct. The carbon fibers may have the further advantage in that their surfaces are inherently rough and porous thereby providing better adhesion to the metallic matrix. In addition, the inertness of the carbon material yields a contact surface relatively immune to acids and other contaminants resulting from metal plating of the fibers.

The use of continuous fibers, which extend from one end of the composite member to the other end, offers several advantages over short, discontinuous fibers. For example, composite members fabricated with continuous fibers are generally mechanically stronger than composite members made with short, discontinuous fibers, which allows the composite members to be made with a lesser amount of the metallic matrix. Also, the use of continuous fibers allows the fabrication of the brush-like structure, whereas the brush-like structure may be impossible with short, discontinuous fibers due to their insufficient length.

Any suitable electrically conductive metallic matrix having a DC volume resistivity of preferably less than about 100 micro ohm cm may be employed in the practice of the present invention. Typically, the electrically conductive metallic matrix is selected from the group of metals including noble metals, metal alloys including eutectic metal alloys and solders such as Woods metal and tin lead, and synthetic metals.

Suitable metals include for example aluminum, bismuth, copper, indium, iron, lead, nickel, rhodium, tin, and tungsten, as well as the noble metals such as gold, silver, platinum, and palladium.

Alloys of the metals described herein may be used as the metallic matrix. Specific examples of alloys, which may include eutectic alloys, are (percentages are by weight): bismuth (58%)/tin (42%)/indium (in trace amounts of indium); Rose's metal comprised of bismuth (50%)/lead (25%)/tin (25%); tin (77.2%)/indium (20.0%)/silver (2.8%); Wood's metal comprised of bismuth (50%)/lead (25%)/tin (12.5%)/cadmium (12.5%); indium (70%)/lead (30%); indium (50%)/lead (50%); indium (40%)/lead (60%); tin (60%)/lead (40%); silver (10%)/copper (90%); silver (50%)/copper (50%); gold (80%)/copper (20%); and silver (80%)/aluminum (20%).

Specific examples of eutectic alloys include the following (percentages are by weight): bismuth (55.5%)/lead (44.5%); bismuth (58%)/tin (42%); indium (52%)/tin (48%); bismuth (46%)/tin (34%)/lead (20%); indium (44%)/tin (42%)/cadmium (14%); bismuth (50%)/lead (26.7%)/tin (13.3%)/cadmium (10%); and bismuth (44.7%)/lead (22.6%)/indium (19.1%)/tin (8.3%)/cadmium (5.3%).

The phrase synthetic metals is meant to include those chemical compounds having metallic properties but which are distinguishable from the naturally occurring elemental metals or their combinations which produce alloys. The following types of materials are considered to be synthetic metals: low-dimensional conductors and superconductors such as organic charge-transfer compounds, metal chain compounds and transition metal layered compounds; conducting polymers; and intercalation compounds of graphite (or related layered structure materials) of either the donor or acceptor type. Specific examples of synthetic metals include polyacetylene, polypyrrole, polythiophene, polyaniline, poly(3-(4-octylphenyl)thiophene), Li-doped polyacenic semiconductor, N-(2-hydroxyethyl)pyrrole, 2-(N-pyrrole) ethyl acetate, and poly(2-(N-pyrrole) ethyl acetate. Synthetic metals are illustrated in *Scientific American,* p. 82 (July 1995) and *Synthetic Metals, The Journal of Conducting Polymers and Molecular Metals,* vol. 73, all pages, (1995), both disclosures are totally incorporated by reference.

The electrical components according to the present invention may be made by any suitable technique wherein the conductive fibers may be oriented substantially parallel to one another and to the axial direction of the composite member and are continuous from one end of the member to the other. Typically, the electrical components may be made by techniques wherein the molten metallic matrix is impregnated into arrays of conductive fibers. These techniques include molding and casting applications wherein the fibers are placed in a mold and thereafter the molten material to be used as the conductive metallic matrix is added while keeping the fibers as strands so that they are substantially parallel and along the direction of the axis or functional dimension of the molded or cast article upon solidification of the molten metallic matrix.

Typically, the fibers are supplied as continuous filament yarns having, for example, 1,000, 3,000, 6,000, 12,000 or up to 160,000 filaments per yarn bundle. Typically the fibers provide in the formed member from about $6\times10^5$ (a nominal 10 micrometer diameter fiber at about 75% of the end view cross-sectional area of the formed composite member) to about $2\times10^6$ (a nominal 7 micrometer diameter fiber at about 75% to 78% of the end view cross-sectional area of the composite member) point contacts per $mm^2$.

The fiber loading and the selection of the metallic matrix depend upon the conductivity desired as well as on the cross sectional area and other mechanical properties of the final configuration. Typically, the metallic matrix has a specific gravity of from about 5 to about 8 $gm/cm^3$ when the metallic matrix is a metal; synthetic metals can have a specific gravity of less than about 3.0 $gm/cm^3$. The fibers have a specific gravity of preferably from about 1.6 to about 2.0 $gm/cm^3$. While the fibers may be present in amounts as low as about 0.01% of the end view cross-sectional area of the composite member, in providing preferred levels of conductivity and fibers at the contact surface heretofore mentioned, typically the conductive fibers are present in the composite member in an amount of at least about 50%, preferably at least 60%, more preferably at least 75%, and especially about 75% to 78%, of the end view cross-sectional area of the composite member, the higher fiber loadings providing more fibers for contacts having high contact area. In general, to increase either the electrical or thermal conductivity of the metallic matrix additional metallic matrix material may be added.

After the conductive fibers have been oriented in the appropriate direction in the metallic matrix, the metallic matrix may be solidified, by cooling for example, to provide the composite member according to the present invention. Thereafter, the composite member may be further shaped in conventional manners. At least one end of the composite member is fibrillated to provide a brush-like structure which may be accomplished by any suitable technique and typically includes heating by way of exposure to a laser beam as well as cutting away the metallic matrix by way of a water jet. Attention is directed to the above referenced U.S. Pat. No. 5,270,106, the disclosure of which is totally incorporated by reference, for an illustration of the use of a laser beam to melt and remove the metallic matrix material from around the ends of the composite member to form the brush-like structure. It is believed that some metals may not respond to the laser energy in the same way as polymers do and that where the metallic matrix is a metal, the laser energy may cut the composite member, but may only minimally fibrillate the end of the composite member. Other fibrillation techniques such as water jet or acid etch may work better when the metallic matrix is a metal. It is believed that laser fibrillation may still be satisfactory with some of the synthetic metals.

Water jet apparatus are available from Flow International. Preferred parameters for employing a water jet to fibrillate the composite member to create the brush-like structure include: water pressure ranging from about 50,000 to about 55,000 psi; an orifice size ranging from about 3 to about 5 mils; and a cut rate ranging from 0.1 to about 30 inches/minute.

An acid etch to fibrillate the composite member to create the brush-like structure may also be used. This method involves dipping the desired length of the composite member into an acid bath for an appropriate time ranging for instance from about 1 to about 30 minutes. Alternatively, the acid etch can be directed at the portion of the composite member to be fibrillated. Suitable acids for particular metals include for example the following: $HNO_3$ or $H_2SO_4$ for copper; NaOH, HCl, $H_2SO_4$, or hot acetic acid for aluminum; $HNO_3$, hot $H_2SO_4$ or KCN for silver; liquid iron for carbon; $HNO_3$ or hot concentrated $H_2SO_4$ for lead; HCl, $H_2SO_4$, or dilute $HNO_3$ for nickel; and NaOH, HCl, $H_2SO_4$, or aqua regia (1 part $HNO_3$ and 3 parts HCl) for tin. The acid may be present in a concentration ranging for instance from about 5% to about 10% by weight.

An electrochemical etch is another possible fibrillation method. The desired length of the composite member is immersed in the bath and the composite member is turned into the anode for the reaction.

The following techniques may be used to selectively remove the metallic matrix without removing any metal plating on the fibers. Where the metal plating and the metallic matrix involve different materials, there may be used differential solubilization by a solvent or differential heating. Where the metal plating and the metallic matrix involve the same material, there may be used time based rate of removal by a solvent or specific place of removal by a solvent.

Figure 2:
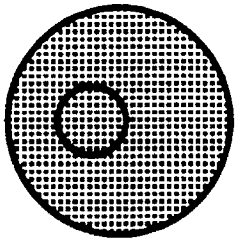
FIG. 2 is a view of the cross section of the fibrillated member in FIG. 1
Figure 4:
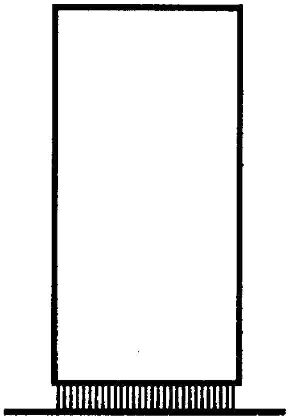
FIG. 4 illustrates an additional embodiment in cross section of a composite member wherein one end has been fibrillated to only a very short length compared to the fiber diameter and the terminating ends provide a relatively rigid contacting surface.
Figure 5:
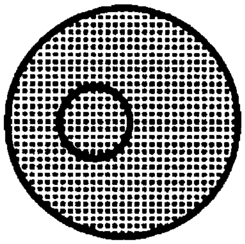
FIG. 5 is a view of the cross section of the fibrillated member in FIG. 4

Attention is directed to FIGS. 2 and 5 which illustrate preferred embodiments of an electrical component according to the present invention having a fibrillated brush-like structure at one end of the composite members which provides a densely distributed filament contact with an electrically contacting surface. With the above-described composite members it will be understood that the brush-like structures have a fiber density of at least 1000 fibers/mm$^2$ and indeed could have fiber densities in excess of about 15,000/mm$^2$ to provide the high level of redundancy of electrical contact. It will be appreciated that such a level of fiber density is not capable of being accurately depicted in FIG. 2, FIG. 3, FIG. 5 and FIG. 6. FIG. 1 and FIG. 4, however, do illustrate that the fibers of the brush-like structure have a substantially uniform fiber length and that there is a well defined zone of demarcation between the brush-like structure and the portion of the composite member including the metallic matrix which is enabled through the precision control of the laser, the water jet, or the acid etch process.

Figure 3:
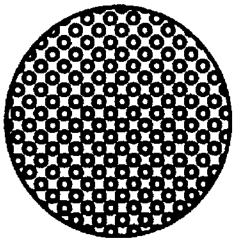
FIG. 3 is a further enlarged magnified view of a portion of the cross section in FIG. 2.

FIG. 1, FIG. 2 and FIG. 3 also illustrate an electrical component wherein the fibers of the brush-like structure have a length much greater than five times the fiber diameter and are therefore generally resiliently flexible behaving elastically as a mass when deformed. This type of electrical component would find utility in those applications where it is desirable to have a contact of resiliently flexible fibers such as a commutator brush. In these contacts it should be noted that the individual fibers are so fine and resilient that they will stay in contact with another contacting surface and do not bounce or disrupt contacts such as frequently may happen with traditional metallic contacts. Accordingly, they continue to function despite minor disruptions in the physical environment. This type of macro fibrillation is to be distinguished from the more micro fibrillation illustrated in FIG. 4, FIG. 5 and FIG. 6 wherein the fibers in the brush-like structure have a length shorter than about five times the fiber diameter and the terminating ends provide a relatively rigid and nondeformable contacting surface. With this component, there will be a minimal deflection of the individual components and they will therefore find utility in applications requiring stationary or nonsliding contacts such as in switches and microswitches. Nevertheless, they provide a highly reliable contact providing great redundancy of individual fibers defining the contacting surface. It is particularly important in this micro embodiment that a good zone of demarcation between the metallic matrix section and the brush-like structure be maintained to provide a uniform contact and mating face with the other surface. If there is not a good demarcation between these two sections of the composite member and if the brush-like structure does not have a substantially uniform fiber length, different contact pressures will be present in the contacting surface thereby presenting a non-uniform surface to the other contact.

The phrase zone of demarcation refers to that portion of the composite member where the metallic matrix is partially removed, which is between the fibrillated brush-like structure having minimal or no metallic matrix material and the section of the composite member where no metallic matrix has been removed. The particular metallic matrix removal process employed affects the gradation of the remaining metallic matrix in the zone of demarcation. In the zone of demarcation a small volume of the metallic matrix is raised substantially in temperature upon contact with the light induced heat produced by the laser. The heat spreads from the hot contact zone to the colder bulk of the material due to thermal conductivity of the material, energy in the laser spot and time of exposure. The temperature profile along the length of the metallic matrix created during the dynamic heating results in a gradation of melted metal in the zone of demarcation.

As used herein, the phrase "free fiber length" refers to the length of the fibers in the brush-like structure of the composite member. Any suitable free fiber length up to an inch or more may be used. However, a free fiber length greater than about 5 millimeters may be impractical as being too costly to both remove and waste the metallic matrix compared to other conventional assembly techniques for brush structures. For electrostatic and other electrical and electronic applications a free fiber length of from about 0.01 to about 3 millimeters is preferred. In the micro embodiment (where the free fibers are for example less than about 10 microns) the fibrillated end feels like a solid to the touch because the fibers are too short to be distinguished from the portion of the composite member containing the metallic matrix. However, in the macro embodiment (greater than 0.25 mm), the fibrillated end feels like a fuzzy velour or artist's brush.

The fibrillated member may be used to provide at least one of the contacting components in a device for conducting electrical current, the other contacting component being selected from conventional conductors and insulators. In addition or alternatively, both of the contacts may be made from similar or dissimilar inventive composite members and inventive fibrillated composite members. Alternatively, one contact may be a composite member but not fibrillated. One contact may be macro fibrillated and the other micro fibrillated. One contact may be a composite member comprising carbon fibers in a metal matrix and the other contact may be a composite member including carbon fibers in a synthetic metal or metal alloy matrix. Furthermore, one or both of the contacts may provide a mechanical or structural function. For example, in addition to performing as a conductor of current for a connector the solid portions (i.e., containing the metallic matrix) of a fibrillated composite member may also function as a mechanical member such as a bracket or other structural support or as a mechanical fastener for a crimp on a metal connector. A portion of a fibrillated composite member may provide mechanical features such as a guide rail or pin or stop member or as a rail for a scanning head to ride on and also provide a ground return path. Accordingly, functions can be combined and parts reduced and in fact a single piece can function as electric contact, support piece for itself and an electrical connection. Further, certain composite members containing a metal or metal alloy matrix may be soldered or welded as an attachment method which is not possible with prior art distributed filament contacts.

Figure 7:
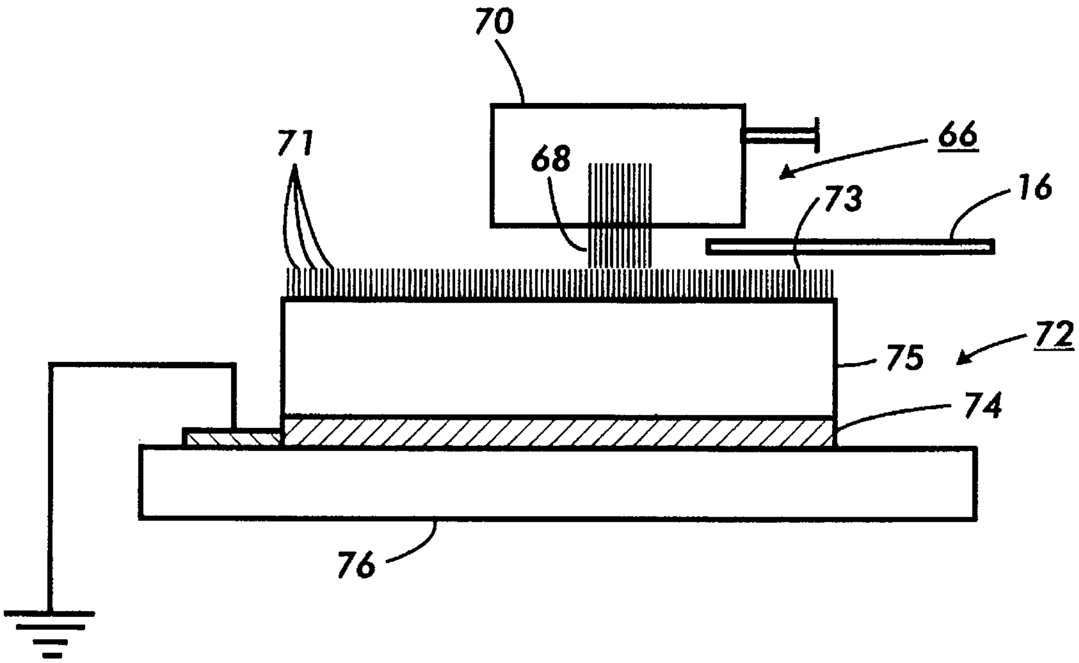
FIG. 7 is a representation of a sensor having a pair of oppositely disposed conductive contacts.

With reference to FIG. 7, there is shown in a path of movement of a document 16 document sensor 66. The document sensor 66 generally includes a pair of oppositely disposed conductive contacts. One such pair is illustrated as a fibrillated brush 68 carried in upper support 70 in electrical contact with composite member 72 carried in lower conductive support 74. The lower composite member comprises a plurality of conductive fibers 71 in a metallic matrix 75 defining surface 73 comprised of free fiber tips with the one end of the fibers being available for contact with the fibers of the fibrillated brush 68 which is mounted transversely to the sheet path to contact and be deflected by passage of a document between the contacts. When no document is present, the fibrillated brush fibers 68 form a closed electrical circuit with the surface 73 of the composite member 72.

Figure 8:
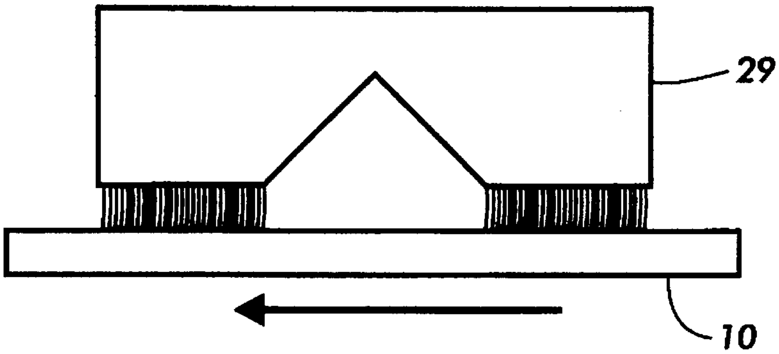
FIG. 8 is an enlarged view from the side of a photoconductor grounding brush in contact with a moving photoconductor surface.

Attention is directed to FIG. 8 wherein a side view schematic of a photoconductor grounding brush 29 is illustrated with the photoconductor 10 moving in the direction indicated by the arrow. A notch or "V" is formed in the matrix portion of the grounding brush since the moving photoconductor belt can have a seam across the belt which would otherwise potentially disrupt the grounding operation. This geometry provides two fibrillated brush-like structures which are separated by the space of the notch or "V".

Figure 9:
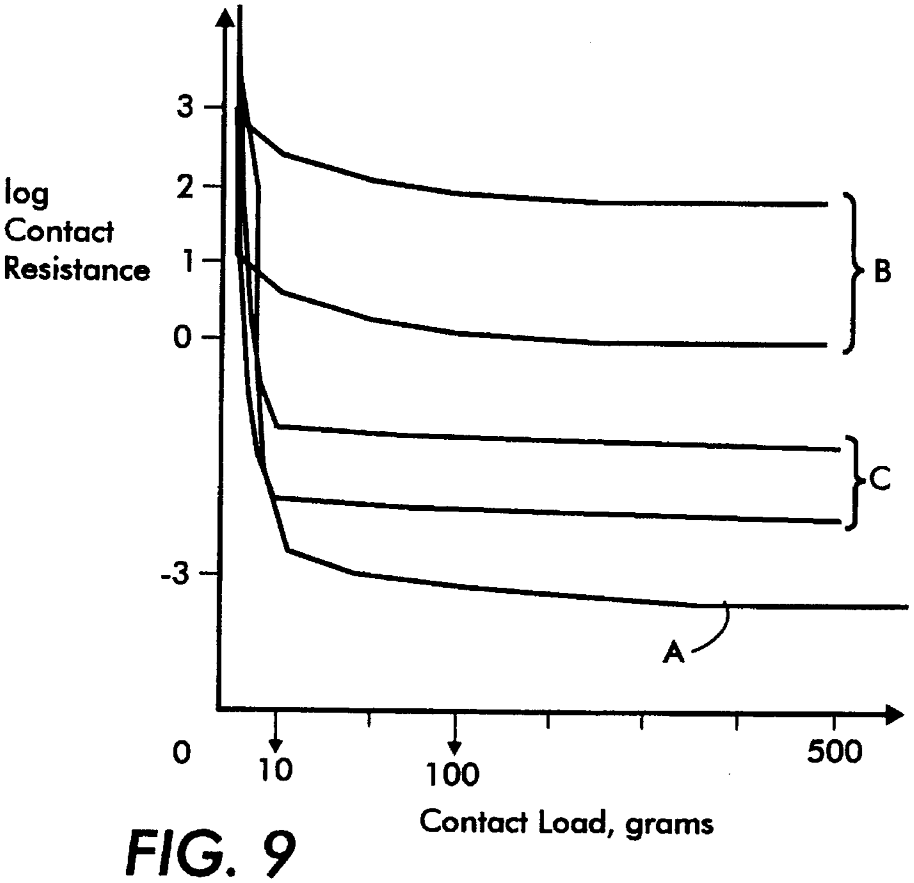
FIG. 9 is a graphical representation of the log of the electrical contact resistance as a function of the contact load for pairs of distributed filament contacts ("DFC") from a metallic matrix/carbon fiber composite and a polymeric resin/carbon fiber composite from the previously described prior art with a typical conventional metal-to-metal contact pair.

FIG. 9 illustrates the contact resistance behavior for three sets of contact materials as a function of the loading force of one contact against the other of the pair. The resistance-force behavior of a typical metal contact pair operating in the open environment, such as: copper, beryllium-copper, tin, tin-lead, silver, silver-copper alloys, and the like, is shown as the bottom curve "A." The resistance is characteristically high until a threshold load is applied (about 1–5 grams in this example) and then falls rapidly as somewhat higher loads are applied (10 gms) until a stable minimum is observed (shown here at about 1 milliohms at greater than 10 gms). Although typical polymeric resin/carbon fiber distributed filament contacts (see upper curves labelled region "B") produces a higher contact resistance, it does this at forces typical of metal contacts (i.e. 1–10 gms).

The perceived advantage of the inventive metallic matrix/nonmetallic fiber distributed filament contact is illustrated by the middle set of curves (region "C") where achievement of contact resistances more closely approaching those of metal is accomplished with lower contact resistances than the typical polymeric resin/carbon fiber distributed filament contacts ("DFCs") represented by region "B". This feature enables lower cost, higher life devices, such as switches, that may be used with lower mechanical stresses.

Further, the operational life of metallic matrix DFCs is long compared with typical metal contacts because DFCs are more tolerant of the contaminants (such as dust, oil, caustic gases, and the like) which are known to affect the life of traditional solid metal contacts.

Figure 10:
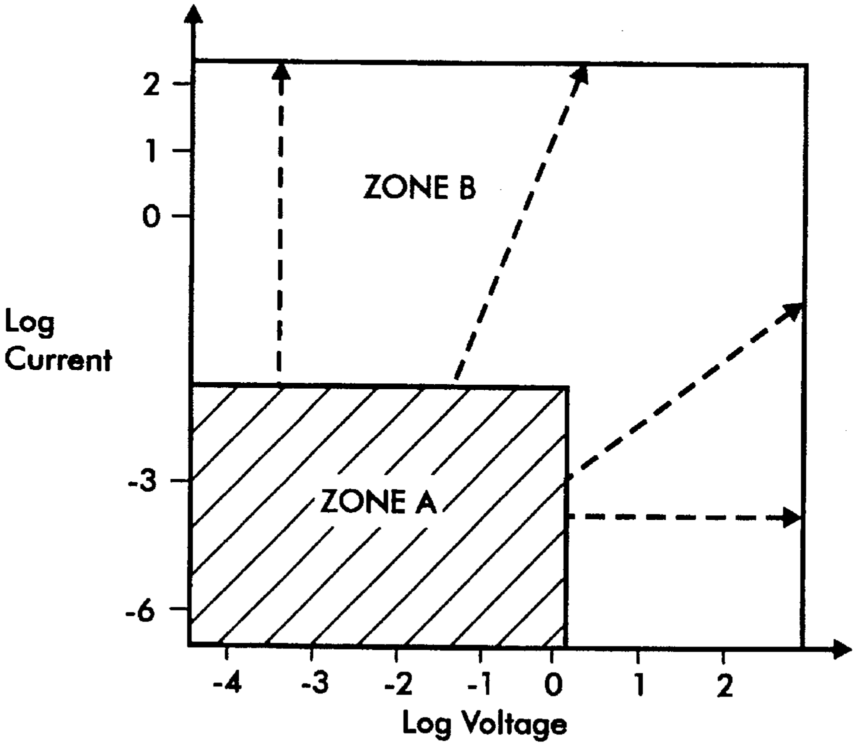
FIG. 10 is a graphical comparison of the operational capability of distributed filament contacts prepared from a metallic matrix/carbon fiber composite to a polymeric resin/carbon fiber composite.

FIG. 10 illustrates in "ZONE A" the range of operating voltages and currents of a conventional distributed filament contact prepared from a carbon fiber filled pultrusion having vinyl ester resin as the polymeric binder. These conventional DFCs are typically resistive in comparison to metal contacts (ohms for the former and milliohms for the latter) and thus are designed to function in circuits having voltages less than about 5–10 volts and with currents less than about 500 milliamps. This type of DFCs have been referred to as low energy or "Electronic" contacts.

Figure 6:
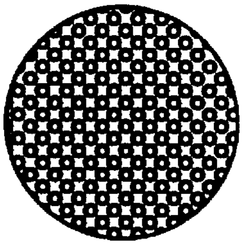
FIG. 6 is a further enlarged magnified view of a portion of the cross section in FIG. 5, where there is illustrated the fibers in close packed hexagonal array.

Replacing the polymer resin of a conventional DFC with a suitable metallic matrix (while retaining the nonmetallic fiber) gives birth to a new type of DFC. FIG. 6 illustrates in "ZONE B" (ZONE B includes ZONE A) the advantages that metallic matrix type DFCs provide: higher operating voltages and currents are feasible with the new contacts enabled by the substantially lower contact resistance of the metallic matrix/nonmetallic fiber composite member while retaining the high reliability nature provided by fiber rich contacting surfaces. A wider range of applications is possible given these capabilities.

Thus, according to the present invention an electrical component and device having a preferably densely distributed filament contact with a very high redundancy of available point contacts are provided which have a metallic matrix providing low electrical contact resistance without a high force mechanical contact that will support greater power throughput than previously described distributed filament contacts based on the use of insulating polymeric materials and which also removes traditional failure modes of metal contacts by employing relatively low normal forces between the contact and an additional contacting surface. This enables utilization of the electrical components and devices according to the present invention in high power applications as well as the low power applications of the prior art while at the same time providing high bulk conductivity and high surface densities of the fiber point contacts. Accordingly, distributed filament contacts and devices employing them are no longer limited to applications in the lower electrical power regime employing milliamps and small potentials of the order of single volts but rather have applications in the higher power environments wherein currents in the single amp and above as well as potentials in the single digits and above may be employed. The combination of high bulk conductivity and high surface densities of fiber point contacts has not previously been obtained with conventional distributed filament contacts as previously discussed. This enables high contact power ratings and high reliability in electrical components and devices employing the composite member of the present invention. A further advantage of the present invention is that the use of a metallic matrix can reduce the thermal resistance of the matrix which permits the reduction of its bulk temperature. Lowering the operational temperature enables greater power handling capabilities while maintaining a low contact pressure. This has important applications in sliding contacts which are typically used in electrostatographic machines in that it is desired to maintain low temperatures at a sliding interface where friction and current flow may give rise to a temperature rise and interaction with contaminating materials such as toner.

Since most metals are 20 to 30 times more electrically conductive than carbon fiber filler, the role of the metallic matrix in the nonmetallic fiber/metallic matrix composite member is to decrease the bulk resistance of the inventive composite member by a significant factor, such as about 20 to 30 times. In conventional DFCs, carbon fiber to carbon fiber contact is the primary conduction path across the mated contact pair's boundary; the series circuit resistance of the contacts will continue to be governed by the fiber to fiber contact. However, depending on the contact geometry chosen, the bulk resistance of the metallic matrix may contribute about 50% to about 95% of the total circuit resistance. Thus, lower bulk resistances are a vehicle to lower total circuit resistances. Further, upon using carbon fibers as the primary element of a power contact, high current flows or surges will initiate a thermal rise in the carbon which initiates a decrease in contact resistance. The inventive composite member is viewed therefore as being able to withstand many of the high current induced failure modes of metal only contacts. Applications for use include power switching, power commutation, and others that require the combination of low cost, high contact power ratings, and high reliability. Development, charging, transfer, and cleaning rollers commutators and photoreceptor grounding devices are illustrative applications of the inventive composite member.

The invention will now be described in detail with respect to specific preferred embodiments thereof, it being understood that these examples are intended to be illustrative only and the invention is not intended to be limited to the materials, conditions or process parameters recited herein. All percentages and parts are by weight unless otherwise indicated. As used herein, room temperature, ambient temperature, and ambient conditions refer to a temperature of about 25° C.

EXAMPLE

Six strands of nickel coated carbon fiber tow (each contained 3,000 filaments with a total weight of about 0.6 g each) from Cyanamid Corp. (CYCOM™ nickel coated graphite fiber) were depassivated by dipping in about 10% HCl and then were dipped in molten Woods metal at about 85°–90° C. The composition of Woods metal was bismuth (50%)/lead (25%)/tin (12.5%)/cadmium (12.5%). The melting point of this metal was 70° C. which made it easy to work with without going to the higher melting temperatures typical of metal and metal alloys. The molten metal did not wet the fiber if it is not depassivated but after acid treatment each fiber was fully wetted by the metal and wicked the molten metal very well into the inter fiber voids, and thereby picked up from about 1.5 to about 2.2 grams of metal. A teflon compression molding fixture (referred to herein as "fixture") was then heated in a laboratory air circulating oven to about 80° C. The metal wetted strands were placed in the fixture slot and compressed as they softened. The top of the fixture was put in place and pressure was applied by use of a C-clamp. When the composite bar had been squeezed to its minimum thickness, the fixture was allowed to cool at lab ambient conditions. The resulting bar of composite material was about 15 cm long, 7 mm wide and 1 mm thick, with a total weight of 7.64 g. All of the six strands were compression molded (3,000 fibers/strand) together into a strong solid bar of uniform composition which contained about 18,000 individual fibers in the 7 $mm^2$ cross-section. Using specific gravity values of 1.7 gm/cc for carbon and 8.5 gm/cc for the Woods metal, the carbon fiber fill was calculated to be about 20% by volume. The resistance of the bar was less than 0.1 ohm over about a 15 cm sample length as determined on a portable multimeter.

Furthermore, while the preferred embodiments have been described with reference to a one step laser cut and fibrillating process, a water jet process, and an acid etch process, it will be understood that cutting and fibrillating steps may be performed separately and in succession, and by any suitable processes. Accordingly, it is intended to embrace all such alternative modifications as may fall within the spirit and scope of the appended claims.

It is claimed:

1. An electrical component for making electrical contact with another component comprising a composite member including a plurality of electrically conductive, nonmetallic fibers in an electrically conductive metallic matrix selected from the group consisting of metals and metal alloys, wherein said composite member has an axial direction and a DC volume resistivity of less than about 100 micro ohm cm, said plurality of conductive fibers being oriented in said matrix in a direction substantially parallel to each other and to the axial direction of said member and said fibers being continuous from one end of said member to the other end to provide a plurality of electrical contact points at each end of said member, at least one end of said member having a brush-like structure of said plurality of fibers wherein said brush-like structure is at least substantially free of the metallic matrix, thereby providing a distributed filament contact wherein the terminating ends of the fibers in the brush-like structure define an electrically contacting surface.

2. The electrical component of claim 1, wherein said metallic matrix is an eutectic metal alloy.

3. The electrical component of claim 1, wherein said metallic matrix is a noble metal.

4. The electrical component of claim 1, wherein the composite member has a DC volume resistivity of less than about 10 micro ohm cm.

5. The electrical component of claim 1, wherein said brush-like structure has a substantially uniform fiber length.

6. The electrical component of claim 1, wherein there is a zone of demarcation between the brush-like structure and the portion of the composite member containing the metallic matrix.

7. The electrical component of claim 1, wherein said brush-like structure has a fiber length of from about 0.01 to about 3 millimeters.

8. The electrical component of claim 1, wherein said fibers are carbon fibers.

9. The electrical component of claim 1, wherein said conductive fibers are metal plated carbon fibers.

10. The electrical component of claim 1, wherein said fibers are carbonized polyacrylonitrile fibers.

11. The electrical component of claim 1, wherein the fibers are generally circular in cross section and have a diameter of from about 4 micrometers to about 50 micrometers.

12. The electrical component of claim 1, wherein the fibers have a DC volume resistivity of from about $1\times10^{-5}$ ohm cm to about $1\times10^{12}$ ohm cm.

13. The electrical component of claim 1, wherein said fibers comprise at least 50% based on the end view cross-sectional area of the composite member.

14. The electrical component of claim 1, wherein said fibers comprise about 75% to 78% based on the end view cross-sectional area of the composite member.

15. The component of claim 1 wherein said brush-like structure has a fiber density of at least 1000 fibers per square millimeter.

16. An electrical device for conducting electrical current comprising two contacting components at least one of said components being a composite member including a plurality of electrically conductive, nonmetallic fibers in an electrically conductive metallic matrix selected from the group consisting of metals and metal alloys, wherein said composite member has an axial direction and a DC volume resistivity of less than about 100 micro ohm cm, said plurality of conductive fibers being oriented in said matrix in a direction substantially parallel to each other and to the axial direction of said member and said fibers being continuous from one end of said member to the other end to provide a plurality of electrical contact points at each end of said member, at least one end of said member having a brush-like structure of said plurality of fibers wherein said brush-like structure is at least substantially free of the metallic matrix, thereby providing a distributed filament contact wherein the terminating ends of the fibers in the brush-like structure define an electrically contacting surface.

17. The electrical component of claim 1, wherein the melting point of the metallic matrix is below the melting or decomposition temperature of the nonmetallic fibers.

* * * * *